United States Patent [19]

Holoubek

[11] 4,089,722

[45] May 16, 1978

[54] METHOD OF AFFIXING HEAT TRANSFERRABLE INDICIA TO A FABRIC SURFACE

[75] Inventor: Verne Richard Holoubek, Ixonia, Wis.

[73] Assignee: Holoubek Studios, Inc., Butler, Wis.

[21] Appl. No.: 725,974

[22] Filed: Sep. 23, 1976

[51] Int. Cl.[2] .......... B44C 1/10; B32B 3/16

[52] U.S. Cl. .......... 156/235; 2/246; 156/230; 156/299; 428/200; 428/914

[58] Field of Search .......... 156/248, 249, 234, 235, 156/240, 277, 298, 299, 230, 265; 2/244, 246; 427/148, 152; 96/43; 428/41, 42, 914, 196, 200, 211

[56] References Cited

U.S. PATENT DOCUMENTS

| | | | |
|---|---|---|---|
| 1,875,410 | 9/1932 | Babcock | 96/43 UX |
| 1,889,484 | 11/1932 | Marshburn | 156/249 X |
| 2,465,927 | 3/1949 | Rapp | 156/235 X |
| 3,130,984 | 4/1964 | Fenberg | 428/914 X |
| 3,484,972 | 12/1969 | Christman | 156/230 X |
| 3,920,499 | 11/1975 | Day et al. | 156/240 |

*Primary Examiner*—William A. Powell

*Assistant Examiner*—Thomas Bokan

*Attorney, Agent, or Firm*—Andrus, Sceales, Starke & Sawall

[57] ABSTRACT

A carrier sheet contains a plurality of vertical and horizontal lines of perforations which intersect to define a plurality of substantially rectangular subsections each containing a heat releasable indicia upon a first side and a series of vertically spaced parallel guide lines upon a second oppositely disposed side. The indicia are correlated with the oppositely disposed parallel guide lines and with the subsection side edges to facilitate alignment and spacing with adjacent subsections containing indicia. Selected subsections are selectively removed from the carrier sheet and aligned upon a receiving fabric surface where the indicia directly engage and become permanently bonded to the fabric surface in response to heat. The carrier subsections are selectively removed from the fabric receiving surface following the application of heat and curing leaving the indicia permanently bonded to the fabric surface in predetermined alignment and spacing with adjacent indicia. Aligned subsections may be interconnected through the use of an adhesive tape prior to the application of heat.

8 Claims, 10 Drawing Figures

Fig.3
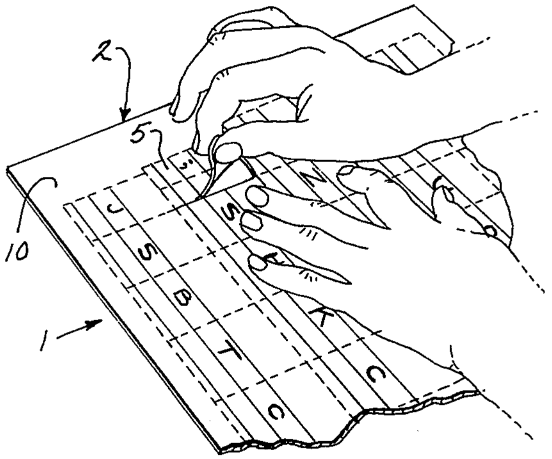
Fig.4
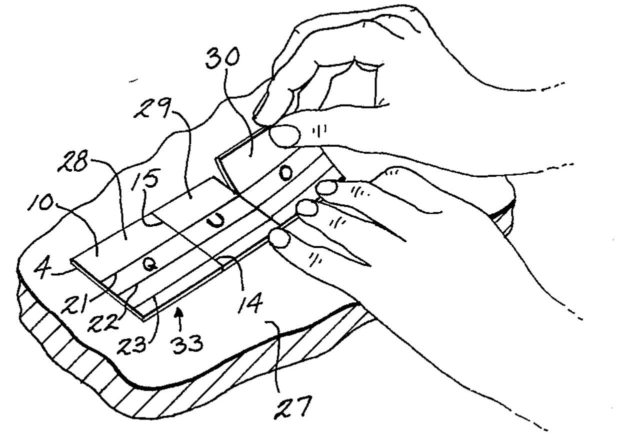
Fig.5
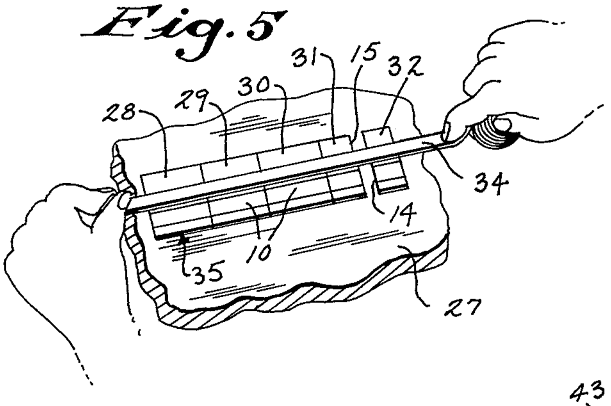
Fig.6
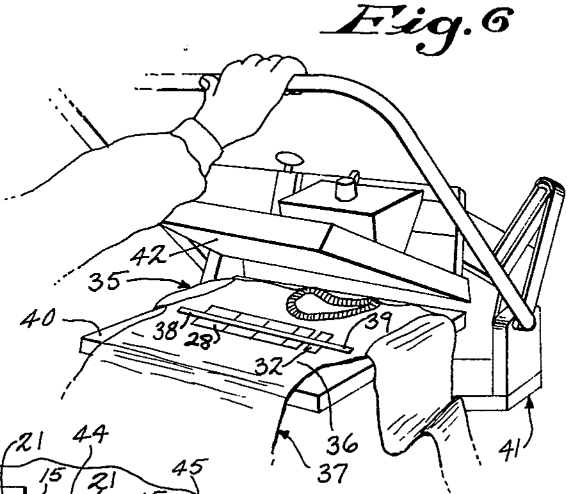
Fig.9
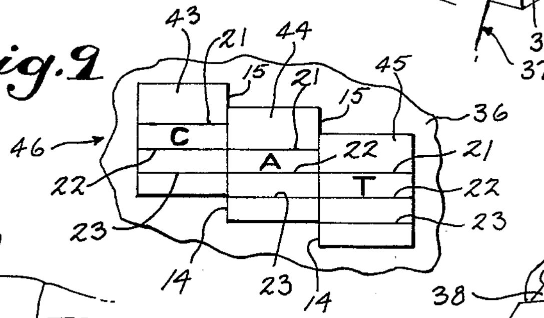
Fig.7
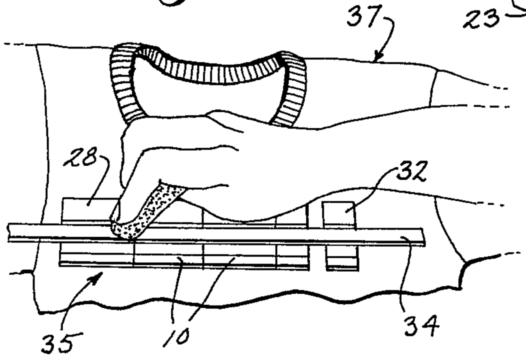
Fig.10
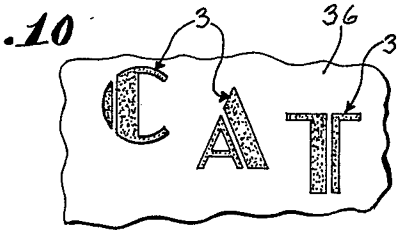
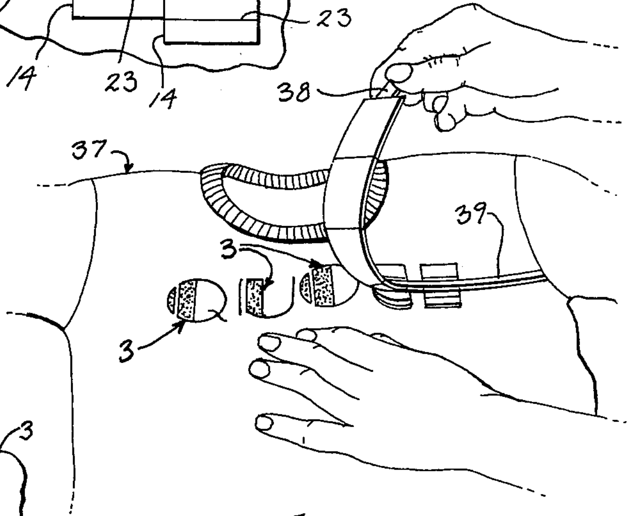
Fig.8

METHOD OF AFFIXING HEAT TRANSFERRABLE INDICIA TO A FABRIC SURFACE

BACKGROUND OF THE INVENTION

This invention relates to heat releasable indicia and to a method for transferring such heat releasable indicia from a carrier sheet to a receiving surface.

Pressure-sensitive numbering and lettering systems frequently found in the industrial lettering arts have been devised wherein an individual letter or number having a back surface coated with a high grip adhesive is individually sandwiched between a backing sheet coated with an adhesive repellant substance and a cover sheet having one side coated with a low grip adhesive substance and an opposite side containing a registered aligning form for cooperation with a guide line on a mounting surface, such as suggested in the U.S. Pat. No. 3,484,972 to R. E. Christman. While such systems have been designed for various surfaces such as windows, doors, walls, mirrors, automobile and truck paneling, et cetera, they are not believed to be extremely compatible with flexible surfaces such as fabrics which are subjected to extreme moisture and heat conditions such as occurring during normal fabric washing.

Heat transfers have been widely used in the application of indicia such as designs, pictures, letters, numbers, words, figures, marks or the like to a receiving surface and particularly in situations where the indicia is permanently bonded to a T-shirt or other fabric. Such heat transfers generally include an individual carrier sheet containing an individual design or other indicia and may include an intervening conventional release coating. The designs or other indicia are generally formed of an adhesive ink which includes a resinous plastisol, heat and light stabilizers, colorants, thickeners, thinners, or other materials which alter the physical ink properties. When applied to a receiving fabric surface, the carrier sheet and retained indicia are placed in direct immediate contact with the fabric surface while heat, such as supplied by an iron or the like, is applied to the oppositely disposed side of the carrier paper. The application of heat to the indicia partially or completely liquifies the resinous ink which engages the fabric fibers. After heating, the heat transfer is cooled thereby curing the resinous ink. The hardening of the resinous ink through cooling forms a permanent bond between the indicia and fabric surface which is greater than the previous or existent bond between the indicia and carrier sheet which thereby allows the carrier sheet to be peeled away leaving the cured indicia in permanent bond with the receiving fabric surface.

Separate individual heat transfers containing individual indicia which are to be used in conjunction with other such heat transfers poses problems of alignment and spacing when applied to a fabric surface and further problems may arise concerning handling and storage where a large multiplicity of varied indicia are involved.

SUMMARY OF THE INVENTION

This invention relates to heat releasable indicia and to a method of transferring such indicia from a retaining sheet to a receiving surface.

A heat transfer includes a sheet and a marking associated with such sheet which defines a detachable subsection of the sheet. A first side of the defined detachable subsection contains a heat releasable indicia which is selectively directly transferrable from the subsection first side to an immediately adjacent receiving surface in response to heat. The subsection is selectively removable from the remainder of the sheet by severing the sheet in accordance with the marking.

A plurality of detachable subsections are defined by a plurality of spaced markings upon the sheet. In a preferred form of the invention, the markings include a plurality of spaced perforations which function to define the plurality of subsections and further facilitate the selective removal of a selected subsection. First and second pluralities of spaced lines of perforations are provided in the sheet with certain of the first perforated lines intersecting certain of the second perforated lines to define the plurality of removable subsections. The first perforated lines in a preferred construction are horizontally spaced and substantially parallel while the second perforated lines are vertically spaced and substantially parallel. The intersecting horizontal and parallel lines thus define a series of substantially rectangular subsections each having upper and lower vertically spaced side edges and first and second horizontally spaced side edges.

In another aspect of the invention, each of the plurality of subsections provide means for selectively positioning a selected subsection in a predetermined relationship with respect to a selected adjacent subsection to thereby position the corresponding indicia in a predetermined relationship with respect to each other. In one form of the invention, the positioning means includes a guide marking located upon a second side oppositely disposed from the first indicia containing side and is employed for alignment with adjacent subsections. The guide means may take the form of a line located between first and second side edges of the subsection with one side edge spaced by a predetermined distance from the indicia so that adjacently disposed subsections are selectively aligned through the alignment of a guide line and side edge of one subsection with a guide line and side edge of an adjacent subsection thereby providing alignment between the adjacent indicia. The guide marking may take another form including a plurality of substantially parallel lines located between first and second side edges of the subsection with the oppositely disposed indicia having a predetermined relationship with at least one of the guide lines so that adjacent subsections are selectively aligned through the alignment of a plurality of guide lines on one subsection with a plurality of guide lines of an adjacent subsection thereby providing alignment between the adjacent indicia. A marking may also be employed on the second side which simulates the oppositely disposed heat releasable indicia.

The positioning means includes a construction wherein the indicia is placed at a preselected position upon its corresponding subsection. In this regard, the indicia is located at first and second predetermined distances from first and second side edges of the subsection for providing predetermined spacing between adjacent indicia through the selective positioning of one subsection side edge in correlation with a side edge of an adjacent subsection.

A heat transfer system is provided which employs a heat transfer utilizing the specifically perforated sheet defining the series of removable subsections each having a first side containing a heat releasable indicia and a second oppositely disposed side having a plurality of spaced guide lines. Such subsections within the heat transfer system are selectively detachable for removable placement with the first sides in immediate abutting relationship with the receiving surface with preselected guide lines aligned. The heat transfer system selectively provides heat to each of the subsections when selectively aligned to operatively transfer the indicia from the subsections to the receiving surface so that a plurality of indicia are transferred and permanently retained by the receiving surface in exacting alignment.

The invention further includes a unique method of permanently affixing heat transferrable indicia to a receiving surface employing a heat source and a heat transfer including a sheet having a plurality of spaced markings defining detachable subsections each having a first side containing a heat releasable indicia. Specifically, predetermined subsections are removed from the remainder of the sheet by severing at and between the markings immediately adjacent the predetermined subsections. The first sides of the removed subsections are placed immediately adjacent the receiving surface and heat is applied to the indicia. With the application of heat, the indicia are transferred from the subsections to the receiving surface to provide a permanent bond between the transferred indicia and the receiving surface. The subsections are thereafter removed from the receiving surface with the transferred indicia permanently bonded to the receiving surface.

In another aspect, the plurality of detachable subsections each provide a second oppositely disposed side containing a guide wherein the method includes a step of aligning such guides of adjacent subsections prior to the application of heat. In another aspect, the method includes the steps of aligning the removed subsections and interconnecting the removed subsections prior to the heat application step. Such an interconnecting step may be accomplished by applying an adhesive tape to the second oppositely disposed sides of the removed subsections. The heat application step may utilize an iron which is directly placed in contact with the second oppositely disposed sides of the aligned subsections having their first sides in immediate contact with the receiving surface such as a T-shirt for example.

The invention provides a unique heat transfer and system and method of permanently affixing heat transferrable indicia to a receiving surface such as provided by a fabric.

BRIEF DESCRIPTION OF THE DRAWINGS

The drawings furnished herewith illustrate the best mode presently contemplated by the inventor and clearly disclose the above advantages and features, as well as others which will be readily understood from the detailed description thereof.

In the drawings:

FIG. 3 is a perspective view showing the selective removal of a subsection from the heat transfer of FIG. 1;

FIG. 4 is a perspective view showing the selective alignment of predetermined subsections upon a mounting surface;

FIG. 5 shows the interconnection of aligned subsections through use of a tape;

FIG. 6 shows the placement of interconnected and aligned subsections upon a receiving surface of a fabric placed within an ironing apparatus;

FIG. 7 is a perspective view showing the application of pressure to the interconnected and aligned subsections following ironing;

FIG. 8 is a perspective view showing the removal of interconnected subsections and the permanent bonding of indicia to the fabric receiving surface;

FIG. 9 is a plan view showing an alternative method of selective alignment of a series of removed subsections; and FIG. 10 shows the permanently bonded indicia upon a fabric receiving surface as produced by the alignment illustrated in FIG. 9.

DESCRIPTION OF THE PREFERRED ILLUSTRATED EMBODIMENTS

Figure 1:
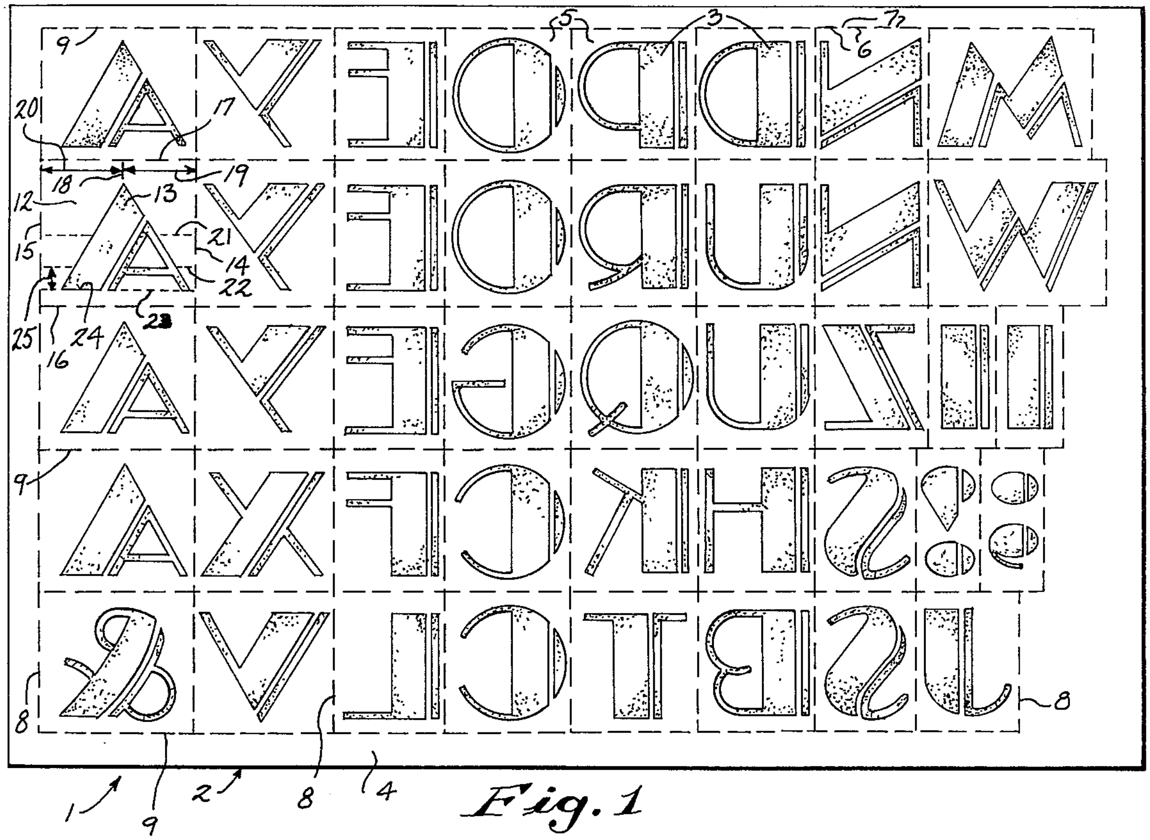
FIG. 1 is a side elevational view of a first side of a heat transfer and shows heat releasable indicia.

Referring to the drawings and particularly to FIG. 1, a heat transfer 1 includes a carrier sheet 2 which may consist of vegetable parchment or any other substance suitable for retaining heat releasable indicia 3 and capable of withstanding substantial heat and pressure without deterioration.

The indicia 3 are placed upon a first side 4 of sheet 2 with each specifically located upon a corresponding subsection as illustrated at 5. The subsections 5 are defined by a series of closely spaced perforations 6 which may be formed by die-cutting sheet 2 or by other suitable cutting or perforating means. Each perforation 6 is generally spaced from an adjacent cut or perforation by a narrow portion 7 of sheet 2 which has a length or dimension which is substantially less than the length or dimension for the perforations 6.

The plurality of perforations 6 are generally aligned along horizontal or vertical paths so as to form tear lines for the selective removal of any particular subsection 5. Specifically, the perforations 6 include a series of horizontally spaced vertical tear lines 8 and a series of vertically spaced horizontal tear lines 9. Certain of the vertical tear lines 8 intersect with certain of the horizontal tear lines 9 to define the plurality of subsections 5 which are generally of a rectangular shape.

The indicia 3, which are illustrated to include various letters and symbols, are formed from an adhesive type ink which may include plastisol, heat and light stabilizers, colorants, thickeners, thinners, or other materials which establish the physical properties thereof. The heat transfer 1 may also include a silicon release coating (not shown) located between the indicia 3 and the sheet 2.

Figure 2:
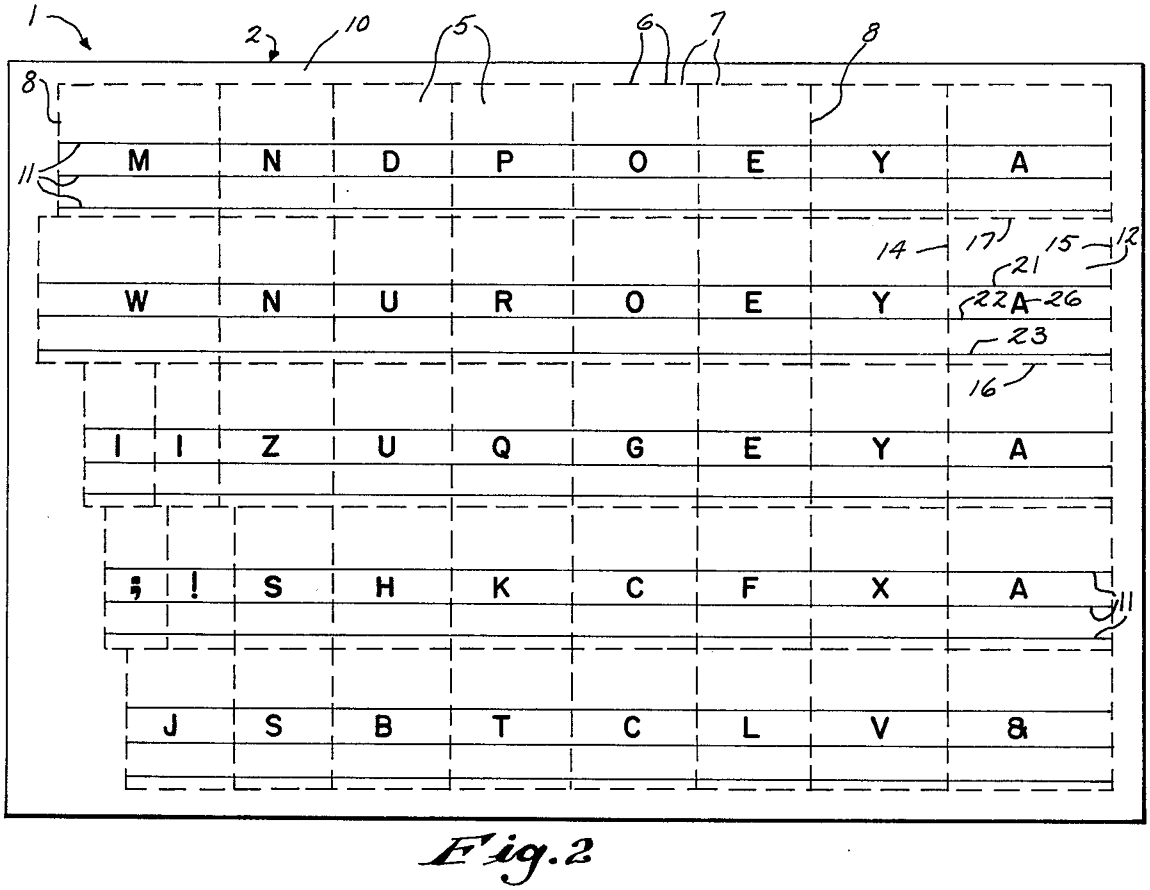
FIG. 2 is a side elevational view of a second oppositely disposed side of the heat transfer of FIG. 1 and shows guides and indicia correlative markings.

A side 10 of sheet 2 is illustrated in FIG. 2 wherein the series of vertical die-cut perforations 8 and the series of horizontal die-cut perforations 9 likewise provide markings showing the series of substantially rectangular subsections 5. A plurality of vertically spaced, substantially parallel guide lines 11 extend between the spaced vertical side edges of each subsection 5. To specifically illustrate the construction, one of the subsections 5 as at 12 includes an indicia 13 located upon side 4 which shows an artistic presentation of the letter "A." The subsection 12 is defined by a vertically extending line of perforations 14 and a horizontally spaced vertical extending line of perforations 15. Subsection 12 is also bounded by a lower horizontal extending line of perforations 16 and a vertically spaced horizontal extending line of perforations 17. The spaced vertical extending lines of perforations 14 and 15 intersect with the horizontal extending lines of perforations 16 and 17 to define the substantially rectangular subsection 12.

The indicia 13 is specially located with respect to the side edges 14 and 15 of subsection 12. For example, a reference point 18, such as the apex of the artistic letter A of indicia 13 for example, is positioned at a first predetermined distance from side edge 14 as illustrated at 19 and at a second predetermined distance from the side edge 15 as illustrated at 20.

The guide lines 11 for subsections 12 include an upper guide line 21, an intermediate guide line 22 and a lower guide line 23 which are vertically spaced and extend between side edge 14 and side edge 15 in substantial parallel relationship. The indicia 13, which is located upon side 4 of sheet 2, is also specially positioned with respect to at least one of the guide lines 21 through 23 which are located upon side 10 of sheet 2. For example, a reference point 24, which represents the lowermost point for indicia 13, is positioned at a predetermined location with respect to one of the guide lines 21, 22 and 23. As illustrated in FIG. 1, the reference point 24 for indicia 13 is located in identical alignment with guide line 23 and at spaced predetermined distances from guide lines 21 and 22. While the reference point 24 is illustrated in alignment with guide line 23 for subsection 12, it is understood that the reference point 24 for indicia 13 may be specially located at a predetermined distance from one or all of the three guide lines 21, 22 and 23. For example, the reference point 24 may be spaced from the guide line 22 by a predetermined distance as illustrated at 25.

The series of spaced perforations, such as those illustrated at 14, 15, 16 and 17 defining the subsection 12, additionally function as tear lines which permit the ready removal of a subsection such as 12 from the remainder of sheet 2. In such manner, any one particular subsection 5 may be selectively removed while leaving the remainder of subsections in an interconnected configuration for ready storage without fear of loss or damage of individual subsections.

Side 10 for each of the subsections further contains a marking indicia which corresponds to the respective oppositely disposed indicia 3. In this regard, a marking indicia 26, such as the letter "A" for subsection 12 shown in FIG. 2, is located between guide lines 21 and 22.

In that the plurality of subsections 5 are constructed in a substantially similar manner as that as described with respect of subsection 12, additional description concerning the remainder of the plurality of subsections is not necessary for the sake of brevity and it is understood that the above description concerning subsection 12 would be similarly applicable to the remaining plurality of subsections.

When used, an individual subsection 5 is selectively removed from the remainder of sheet 2 as illustrated in FIG. 3. A selected subsection such as 12 may be used individually for application to a receiving surface or may be applied in combination with other subsections 5. Where a particular subsection 5 is to be used in conjunction with other subsections and it is desired to provide correlated alignment and spacing between adjacent indicia, certain of the guides 21, 22 and 23 and side edges 14 and 15 are utilized.

In one application, the separated subsections, which are removed from the sheet 2 as illustrated in FIG. 3, are positioned upon a mounting surface 27 so that side 4 containing the indicia 3 of each subsection is placed in direct contact with surface 27 as illustrated in FIG. 4. As an illustrative example, five subsections 28, 29, 30, 31 and 32 are selectively removed from sheet 2 and contain the indicia "Q," "U," "O," "L" and "!," respectively. The respective side edges 14 and 15 for the subsections 28 through 32, inclusive, are placed in abutting relationship. For example, the side edge 15 of subsection 28 is placed in abutting relationship with side edge 14 of subsection 29. Furthermore, the guide lines 21 through 23 for subsection 28 are placed in exact alignment with the corresponding guide lines 21 through 23 of the adjacent subsection 29. As illustrated in FIG. 5, the side edge 14 of subsection 32 is spaced by a predetermined distance from the side edge 15 of subsection 31. The guide lines 21, 22 and 23 of subsection 32, however, are aligned with the corresponding guide lines 21, 22 and 23 of the subsection 31. As illustrated in FIGS. 4 and 5, the guide lines 21, 22 and 23 for subsections 28, 29, 30, 31 and 32 are in uniform alignment.

When aligned as illustrated in FIG. 4, a series 33 including the subsections 28 through 32, inclusive, is formed wherein the corresponding indicia are correlated with respect to each other. In order to secure alignment of the series 33, an adhesive tape 34 is applied to the sides 10 of the subsections 28 through 32, inclusive, thereby interconnecting such subsections to form an interconnected array 35 illustrated in FIG. 5. The array 35 including the series of interconnected subsections 28 through 32 is transferred from the mounting surface 27 to a receiving fabric surface 36 such as provided by a T-shirt 37. A pair of oppositely disposed ends 38 and 39 of tape 34, which extend beyond the outer ends of the series 33 of subsections 28 through 32, are removably connected to the receiving surface 36 to maintain the selected indicia 3 of array 35 in fixed immediate contact with surface 36.

The shirt 37 is shown placed upon a supporting platen 40 of an iron 41 having an upper platen 42 selectively operable to engage platen 40 and sandwich the T-shirt 37 with the interconnected array 35 therebetween. In operation, the iron 41 is heated to a temperature of 350° F which is imparted to the indicia 3 of the array 35 when sandwiched between platens 40 and 42. The operation of iron 41 may also apply pressure to the sandwiched shirt 37 and interconnected array 35 while the predetermined temperature is maintained for a predetermined period of time such as 15 seconds, for example. The heating of the array 35 for a predetermined period of time increases the liquidity of the resins within the adhesive ink thereby releasing its bond from the subsections 5 while intermingling with the fabric fibers of the fabric surface 36. Upon completion of the heat application step, the upper platen 42 is separated from the supporting platen 40 and the receiving fabric surface 37 and interconnected array 35 is removed. Additional pressure may be applied to the array 35 and interconnect T-shirt 37 while the array 35 is permitted to cool for a predetermined period of time, such as sixty seconds, for example. The application of such additional pressure is illustrated in FIG. 7 where a clean dry cloth is rubbed over the array 35 to assure that all edges of the indicia continue to engage the fabric surface 36. When cooled, the resin will cure and solidify to provide a bond with the fabric fibers so that the indicia 3 becomes permanently affixed to the fabric surface 36.

Upon the completion of appropriate cooling, the outer ends 38 and 39 of tape 34 are removed from the receiving fabric surface 36 and the series of subsections 28 through 32, inclusive, are peeled away from the indicia 3 which have been permanently bonded to the receiving surface 36 of T-shirt 37 by the heating and subsequent curing of the adhesive ink. When the array 35 of interconnected subsections, such as 28 through 32 as illustrated in FIG. 8, are peeled away from the fabric receiving surface 36, the bond between the cured resinous adhesive ink provided by the indicia and the fabric surface 36 is much greater than the bond existing between the indicia 3 and side 4 of subsections 5.

While the illustrated preferred embodiment discloses a sequence including the application of an iron temperature of 350° F for 15 seconds and cooling for 60 seconds, other predetermined time durations may be utilized. For example, a conventional hand operated iron may be preheated at a setting between wool and cotton and applied for about thirty to sixty seconds to the heat transfer and adjacent fabric surface. If cooling for 60 seconds is insufficient with the application of the hand iron, additional applications of iron heat and subsequently cooling may be effected prior to the peeling of the subsections from the fabric bonded indicia. Likewise, variations in temperature and pressure may also be utilized. For example, a temperature may be selected from a range of 325° F to 375° F and a pressure selected from the range of 500 to 8,000 pounds per square inch. Of course, other time periods, temperatures and pressures could, under appropriate circumstances, be employed with the invention.

FIG. 9 illustrates an alternative alignment and spacing procedure to provide a series of adjacently interrelated subsections and corresponding indicia. For example, three selected subsections 43, 44 and 45 are selectively removed from the sheet 2 as previously described with respect to FIG. 3. The removed subsections 43, 44 and 45 are directly placed upon a receiving fabric surface 36 and provide a series 46 of interrelated subsections containing correlated indicia, such as "C," "A" and "T," for example. A diagonal type of alignment is illustrated in FIG. 9 by the alignment of guide line 22 of subsection 43 with guide line 21 of subsection 44. Similarly, guide line 23 of subsection 43 is aligned with guide line 22 of subsection 44. In like manner, guide line 22 of subsection 44 is aligned with guide line 21 of subsection 45. Guide line 22 of subsection 45, however, is aligned with guide line 23 of subsection 44. In forming the alignment illustrated in FIG. 9, the side edge 15 of subsection 43 is placed in abutting relationship with side edge 14 of subsection 44. In like manner, the side edge 15 of subsection 44 is placed in abutting relationship with side edge 14 of subsection 45. An exacting alignment in FIG. 9 between adjacent subsections is provided either by the alignment of one guide line and one side edge or, alternatively, the alignment of a pair of guide lines provided by each subsection. Such alignment may be effectuated through direct contact between adjacent subsections as illustrated in FIG. 9 or may be provided through spaced separation such as existing between subsections 31 and 32 illustrated in FIG. 5.

It is understood, of course, that an individual indicia may be selectively bonded to the fabric surface through the application of heat followed by the subsequent alignment of an adjacent subsection which is thereafter bonded to the fabric surface through the subsequent application of heat. Thus, the subsections may be sequentially bonded to the fabric with aligning of additional subsections occurring between the series of heat applications.

The ultimate bonding of the indicia 3 corresponding to the subsections 43, 44 and 45 is illustrated in FIG. 10 to provide the word "CAT." Such indicia 3 illustrated in FIG. 10 provides a unique diagonal alignment wherein adjacent indicia 3 are separated by a predetermined spacing. Such desirable spacing is uniformly maintained by the positioning of the indicia at predetermined locations within their respective subsections such as previously described with respect to the predetermined spacings 19, 20 and 25 shown in FIG. 1.

The heat transfer 1 provides a unique structure for removably retaining a large number of heat releasable indicia which may be compactly and safely stored until usage is required. A unique system is provided for retaining and transferring heat releasable indicia which is employed with means for highly accurate alignment and spacing even when employing subsections from a plurality of sheets.

Various modes of carrying out the invention are contemplated as being within the scope of the following claims particularly pointing out and distinctly claiming the subject matter which is regarded as the invention.

I claim:

1. A method of permanently affixing heat transferable indicia to a fabric surface employing a heat source and a heat transfer including a carrier sheet having a plurality of spaced separation markings defining detachable subsections each having a plurality of alignment markings defining first and second spaced guide axii each intersecting a side edge of said defined subsection and a first side containing a heat releasable indicia positioned at a predetermined location on said carrier sheet relative to said first and second guide axii, comprising the steps of removing a plurality of selected subsections from the remainder of said sheet by severing along a line defined by said separation markings immediately adjacent said selected subsections, placing said first sides of said removed subsections immediately adjacent said fabric surface, axially aligning a selected guide axis of a selected subsection with a selected guide axis of an adjacent selected subsection, selectively applying heat to said indicia and transferring said indicia from said selected aligned subsections to said fabric surface and permanently bonding said transferred indicia while aligned to said fabric surface, and removing said carrier sheets of said selected subsections from said fabric surface with said transferred indicia separated from said carrier sheets and permanently bonded to said fabric surface in correlated alignment.

2. The method of claim 1, wherein said spaced markings include a series of aligned closely spaced perforations, and said removing step includes manually severing at and along said aligned perforations.

3. The method of claim 1, and including the step of interconnecting said removed subsections prior to the heat application step.

4. The method of claim 3, wherein said interconnecting step includes the securing of an adhesive tape to the second oppositely disposed sides of said subsections.

5. A method of permanently affixing heat transferable indicia to a fabric surface employing a mounting surface, an adhesive tape, an iron, and a heat transfer including a carrier sheet having a plurality of spaced markings defining detachable subsections each having a first side containing a heat releasable indicia and a second oppositely disposed side containing a plurality of guide lines, comprising the steps of removing predetermined subsections from the remainder of said sheet by severing at and between said markings immediately adjacent said predetermined subsections, placing said first sides of said removed subsections immediately adjacent said mounting surface and aligning said guide lines of each subsection with said guide lines of adjacent subsections to form a series of correlated subsections, placing said adhesive tape across said series of subsections with an adhesive tape side adhering to said second sides of said subsections within said series and providing first and second outer tape ends extending beyond said series of subsections to form an interconnected array maintaining said subsections in correlated alignment, removing said interconnected array from said mounting surface and placing said first sides of said interconnected array in immediate contact with said fabric surface and affixing said first and second outer tape ends to said fabric surface, applying said iron to said second side of said interconnected array for a predetermined time and transferring said individual indicia while aligned from said subsections within said array to said fabric surface by applying heat of a predetermined temperature to said indicia and permanently bonding said transferred indicia to said fabric surface, applying pressure to said second side of said array, cooling said array for a predetermined time, and removing said array of interconnected carrier sheet subsections from said fabric surface by lifting said tape from said fabric surface with said transferred indicia separated from said carrier sheet and permanently bonded to said fabric surface in correlated alignment.

6. A method of permanently affixing heat transferrable indicia to a fabric surface employing a mounting surface, an adhesive tape, an iron, and a plurality of heat transfers including first and second heat transfers each including a carrier sheet having first and second spaced side edges and top and bottom spaced side edges and a first side containing a heat releasable indicia spaced by first and second predetermined distances from said first and second side edges, respectively, and vertically orientated with respect to said top and bottom edges and a second oppositely disposed side containing a plurality of spaced and substantially parallel guide lines including first, second and third guide lines positioned substantially normal to said first and second side edges, comprising the steps of placing said first sides of said first and second heat transfers immediately adjacent said mounting surface, engaging one of said first and second side edges of said first heat transfer with one of said first and second side edges of said second heat transfer, aligning said first, second and third guide lines of said first heat transfer with said first, second and third guide lines of said second heat transfer and establishing said first guide lines of said first and second heat transfers in substantial axial alignment and said second guide lines of said first and second heat transfers in substantial axial alignment and said third guide lines of said first and second heat transfers in substantial axial alignment and maintaining said engagement of said side edges and thereby forming a series of correlated heat transfers, placing said adhesive tape across said series of aligned and correlated heat transfers so that an adhesive tape side adheres to said second sides of said first and second heat transfers within said series and providing first and second outer tape ends extending beyond said series of heat transfers to form an interconnected array maintaining said first and second heat transfers in said correlated alignment, removing said interconnected array from said mounting surface and placing said first sides of said interconnected array in immediate contact with said fabric surface and affixing said first and second outer tape ends of said fabric surface, applying said iron to said second sides of said carrier sheets of said interconnected and aligned array for a predetermined time and transferring said individual indicia from said first and second heat transfers within said array to said fabric surface by applying heat of a predetermined temperature to said indicia and permanently bonding said aligned transferring indicia to said fabric surface, applying pressure to said second side of said array, cooling said array for a predetermined time, and removing said array of heat transfer carrier sheets including said first and second carrier sheets from said fabric surface by lifting said tape from said fabric surface with said transferred first and second indicia separated from said carrier sheets and permanently bonded to said fabric surface in correlated alignment.

7. A method of permanently affixing heat transferrable indicia to a fabric surface employing a heat source and a plurality of heat transfers including first and second heat transfers each including a carrier sheet having first and second spaced side edges and top and bottom spaced side edges and containing a plurality of alignment markings defining a plurality of spaced and substantially parallel guide axii including first and second guide axii intersecting one of said first and second side edges and a first side containing a heat releasable indicia positioned at a predetermined location on said carrier sheet relative to one of said first and second guide axii and vertically orientated with respect to said top and bottom edges, comprising the steps of placing said first sides of said first and second heat transfers immediately adjacent said fabric surface, placing one of said first and second side edges of said first heat transfer in adjacent proximity with one of said first and second side edges of said second heat transfer, aligning said first and second guide axii of said first heat transfer with said first and second guide axii of said second heat transfer and establishing said first guide axii of said first and second heat transfers in substantial axial alignment and said second guide axii of said first and second heat transfers in substantial axial alignment and forming an array providing correlated alignment of said first and second indicia provided by said first and second transfers, maintaining said correlated alignment of said first and second heat transfers and applying said heat source thereto and applying heat to said indicia and transferring said individual indicia while aligned from said first and second heat transfers within said array to said fabric surface and permanently bonding said transferring indicia to said fabric surface while aligned, cooling said array, and removing said array of heat transfer carrier sheets including said first and second carrier sheets from said fabric surface with said transferred first and second indicia separated from said carrier sheet and permanently bonded to said fabric surface in correlated alignment.

8. A method of permanently affixing heat transferrable indicia to a fabric surface employing a heat source and a plurality of heat transfers including first and second heat transfers each including a carrier sheet having first and second spaced edges and containing a plurality of alignment markings defining a plurality of spaced and substantially parallel guide axii including a first guide axis located adjacent said first edge and a second guide axis separated from said first guide axis and a third guide axis located adjacent said second edge with said second guide axis spaced substantially equidistant between said first and third guide axii and said carrier sheet providing a first side containing a heat releasable indicia positioned at a predetermined location on said carrier sheet relative to said first, second and third guide axii, comprising the steps of placing said first sides of said first and second heat transfers immediately adjacent said fabric surface, aligning in substantial axial alignment a selected pair of said first, second and third guide axii provided by said first heat transfer with a selected different pair of said first, second and third guide axii provided by said second heat transfer and forming an array providing correlated angular alignment of said first and second indicia relative to one of said selected guide axii, maintaining said correlated alignment of said first and second heat transfers while applying said heat source thereto and applying heat to said indicia and transferring said individual indicia while aligned from said first and second heat transfers within said array to said fabric surface and permanently bonding said transferring indicia to said fabric surface while aligned, and removing said array of heat transfer carrier sheets including said first and second carrier sheets from said fabric surface with said transferred first and second indicia separated from said carrier sheet and permanently bonded to said fabric surface in correlated diagonal alignment.

* * * * *